United States Patent [19]

Darling

[11] 3,742,355

[45] June 26, 1973

[54] ELECTRIC METER CONSTRUCTION HAVING CIRCUIT INTERRUPT ELEMENTS

[76] Inventor: William Darling, 1552 Farrow Road, Memphis, Tenn. 38116

[22] Filed: Nov. 12, 1971

[21] Appl. No.: 198,312

[52] U.S. Cl. ................. 324/149, 317/107, 339/36
[51] Int. Cl. ....... G01r 1/06, H01r 13/44, H02b 9/00
[58] Field of Search ............................ 324/149, 156; 317/107, 108, 109, 110; 339/36, 37, 38

[56] References Cited
UNITED STATES PATENTS
2,643,362  6/1953  Johansson ...................... 324/149 X

*Primary Examiner*—Alfred E. Smith
*Attorney*—John R. Walker, III

[57] ABSTRACT

An electric meter having the back side thereof provided with a plurality of cliplike sockets and a plurality of bladelike terminals. Engaging the meter of the present invention to the usual meter base respectively opposingly presents the meter sockets thereof to the usual base sockets of the meter with a spaced distance therebetween and simultaneously engages the bladelike terminals with other ones of the base sockets. A plurality of knifelike members are included and are respectively removably received in certain ones of the base sockets and the opposing meter sockets when the meter of the present invention engages the meter base, thus bridging the spaced distance and rigidly supporting the meter to the meter base. One embodiment comprises constructing the knifelike members from an electrical conducting substance for completing an electrical circuit therewith. A second embodiment comprises constructing the knifelike members from an electrical insulating substance for interrupting an electrical circuit therewith, i. e., for discontinuing electric service to a dwelling or the like and preventing the unauthorized use of electricity.

3 Claims, 7 Drawing Figures

PATENTED JUN 26 1973

3,742,355

INVENTOR.
WILLIAM W. DARLING

BY John R. Walker III
Attorney

ELECTRIC METER CONSTRUCTION HAVING CIRCUIT INTERRUPT ELEMENTS

BACKGROUND OF THE INVENTION

1. Field of the Invention

This invention relates to electric meter construction.

2. Description of the Prior Art

The following five patents have a means for preventing the unauthorized use of electricity through a meter as one of their objects: Lackey U.S. Pat. No. 2,345,269; Johansson U.S. Pat. No. 2,643,362; Rutledge et al. U.S. Pat. No. 2,907,928; Wallman U.S. Pat. No. 3,167,690; and Meacham U.S. Pat. No. 3,518,495.

Perhaps the most prevalent is the Johannson U.S. Pat. No. 2,643,362 which involves a sheathe or cover of insulating material which fits over one end of the usual blade terminals of typical meters and which carries an abutment opposed to an abutment on the blade so that the sheathe is held in position while the blade is being inserted into or withdrawn from the receptacle. A particular disadvantage with the U.S. Pat. No. 2,643,362 is that the sheathe may easily be removed by an unauthorized person, thus enabling him to quickly reconnect the electrical power to the dwelling or the like.

Certain of the above references simply include clamping mechanism for attaching a meter of conventional construction to a mounting base for the support of the meter either in a position closing contact between the power lines and the equipment to be serviced, or, selectively in a different position with the circuit open, the clamp being adapted to be sealed in the usual manner with the meter in either position, e. g., the Lackey U.S. Pat. No. 2,345,269. This particular approach to the problem is not only unsatisfactory for the same reason as just mentioned for the U.S. Pat. No. 2,643,362, but also the disorientation of the meter is undesirable. This feature is pointed out in the Meacham U.S. Pat. No. 3,518,495:

"It is also desirable to have the meter remain in its socket while the load is de-energized. Further, it is desirable to have the meter in the same angular orientation regardless of whether the load is energized or de-energized."

An advantage to having the meter remain in its socket while the load is de-energized is that certain structure of the meter may continue to use the electrical power for assuring that moisture does not collect within the meter casing, thus damaging the meter movement.

A preliminary patentability search revealed the above-mentioned patents, as well as the following U. S. patents: Road U.S. Pat. No. 2,805,403 and Plummer U.S. Pat. No. 3,549,951. None of the references show or suggest applicant's device.

SUMMARY OF THE INVENTION

The present invention is directed towards overcoming the disadvantages and problems relative to previous electric meters, particularly the problem of preventing the unauthorized use of electricity after the power company has discontinued the service to a facility. The concept of the present invention is to construct an electric meter, or modify an existing meter, in such a manner that the back side thereof is provided with a plurality of cliplike sockets. These sockets have structure substantially identical to the usual sockets existing in a typical meter base, i. e., the sockets being substituted for at least two of the usual blade terminals found on the back side of a typical meter. When the meter of the present invention is suitably engaged to the meter base, the plurality of cliplike sockets on the back side thereof are respectively opposingly presented to the sockets attached to the meter base. However, a spaced distance exists between the sockets on the back side of the meter and the sockets attached to the meter base. A plurality of knifelike members are included and are respectively removably received in both the base and the meter sockets, thus bridging the spaced distance and rigidly supporting the meter to the meter base.

The above construction concept preferably pertains to a portion of the electrical terminals on the back side of the meter only. In other words, only the terminals leading to the main distribution panel for the facility are to be changed or so constructed, i. e., the remaining terminals which lead to the source of electrical power remain substantially like those illustrated in FIG. 1 of the Johannson U.S. Pat. No. 2,643,362.

One embodiment of the present invention comprises constructing the knifelike members, i. e., which bridge the spaced distance between the base and meter sockets, from an electrical conducting substance for completing an electrical circuit therewith. A second embodiment comprises constructing the knifelike members from an electrical insulating substance for interrupting an electrical circuit therewith, i. e., for discontinuing electrical service to a dwelling or the like and preventing the unauthorized use of electricity.

It should now be obvious to those skilled in the art that in order to restore service to the facility, it is necessary to replace the insulating knifelike members with conducting knifelike members. Accordingly, the conducting knifelike members preferably are closely controlled by the power company personnel, thus denying access thereof to the average person. Therefore, unauthorized reconnecting of the electricity through the meter of the present invention is highly improbable.

Additionally, the meter of the present invention may optionally be so constructed that the plane of one pair of sockets, i. e., a base socket and a meter socket, is rotated substantially 90° about a horizontal axis to obviate the likelihood of the meter being improperly positioned when connected to the meter base. This feature is particularly directed towards the more conventional type watt hour meters for single phase installation, i. e., having only four terminals which are positioned at the corners of a rectangle.

DESCRIPTION OF THE PREFERRED EMBODIMENTS

Figure 2:
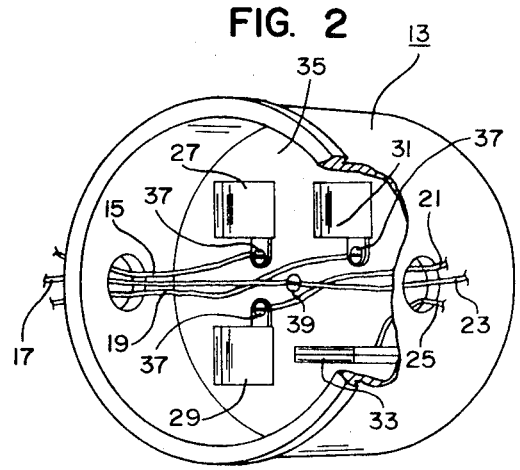
FIG. 2 is a perspective view of a meter base that is compatible with the meter construction of the present invention with a portion broken away for purposes of illustration.

The electric meter 11 of the present invention is intended to be received by a meter base assembly 13 having a plurality of conductors 15, 17, 19, 21, 23, 25 terminating therein as depicted in FIG. 2 of the drawings. The conductors 15, 19 constitute a first group of conductors which carry a typical commercial source of electrical power, e. g., 220 volts AC single phase or the like, from a commercial source of electrical power. The conductor 17 is a ground or neutral conductor.

The meter base 13 includes a plurality of base cliplike conductive sockets 27, 29, 31, 33, attached thereto in any well known manner. For example, the meter base 13 includes a back side 35 (FIG. 5) formed from an insulating material and the sockets 27, 29, 31, 33 may be fixedly attached thereto as with the bolts 37. Additionally, a neutral or ground terminal 39 is fixedly attached to the back side 35 in like manner. It should be understood that the meter 11, as herein disclosed, and its companion meter base 13 are directed toward a 220 volt single phase service; however, it is not to be so limited since the construction concept of the present invention is intended to include five terminal meters required for three wire three phase service, seven terminal meters for four wire service, etc., as taught in a dissertation in the Road U.S. Pat. No. 2,805,403 patent.

The conductors 21, 25 constitute a second group of conductors which extend from the meter base 13 to a typical redistribution panel (not shown) or the like for the facility being serviced by the electrical power. The conductors 15, 19 terminate in an open circuit until the meter 11 is received by the meter base 13 in a manner obvious to those skilled in the art. The ground conductor 17 is connected to the conductor 23, thus the conductor 23 is at ground potential irrespective of whether the meter 11 is installed on the base 13 or not.

The meter 11 includes the usual blade terminals 40, 41 which are suitably attached to the meter assembly 11 and are arranged thereon to respectively be received by the base sockets 27, 31 when the meter assembly 11 is received on the base assembly 13.

Additionally, meter 11 includes a plurality of meter cliplike sockets 43, 47 which are suitably attached to the meter assembly 11 and are arranged thereon to respectively be aligned with the base sockets 29, 33 when the meter assembly 11 is received on the base assembly 13. In other words, the socket 29 is in alignment with the socket 43; and the socket 33 is in alignment with the socket 47 as clearly illustrated in FIG. 5 for the sockets 29, 43.

Figure 5:
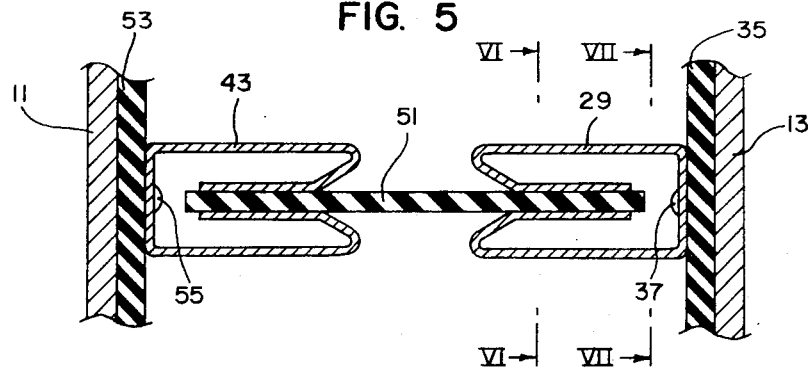
FIG. 5 is an enlarged sectional view showing the engagement of the insulating knifelike member bridging the spaced distance between the sockets on the back side of the meter and the sockets attached to the meter base.
Figure 6:
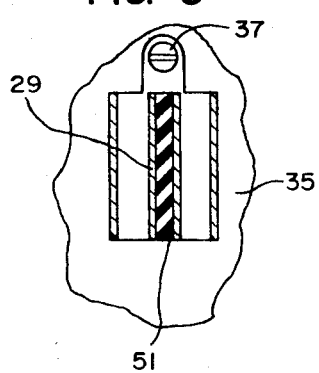
FIG. 6 is a sectional view taken as on the line VI—VI of FIG. 5.
Figure 7:
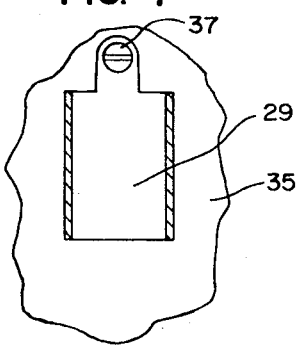
FIG. 7 is a sectional view taken as on the line VII—VII of FIG. 5.

Further, from FIG. 5 of the drawings, it may be seen that the socket 43 has a spaced apart distance from the socket 29 which is equally true for the sockets 29, 43.

Figure 3:
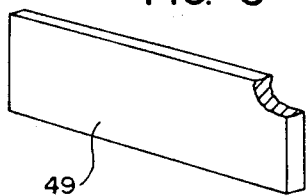
FIG. 3 is a perspective view of an electrical conducting knifelike member comprising, in part, one embodiment of the present invention with a portion broken away for purposes of illustration.

The meter construction 11 of the present invention includes a plurality of knifelike members, e. g., a knifelike member 49 as depicted in FIG. 3 of the drawings. The knifelike members 49 respectively have one of the ends thereof removably received in the base sockets 29, 33 and the opposite ends thereof removably received in the meter sockets 43, 47 for bridging the above-mentioned spaced distance therebetween.

FIG. 3 of the drawings depicts one embodiment of the knifelike members and is character referenced therein by the numeral 49. The knifelike member 49 is constructed from an electrical conducting substance, e. g., copper, aluminum or the like, for respectively completing a circuit between the base sockets 29, 33 and the meter sockets 43, 47, while rigidly supporting the meter assembly 11 to the meter base 13.

Figure 4:
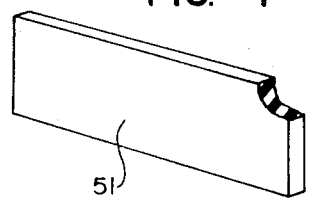
FIG. 4 is a perspective view of an electrical insulating knifelike member comprising, in part, a second embodiment of the present invention with a portion broken away for purposes of illustration.

FIG. 4 of the drawings depicts a second embodiment for the knifelike member which is character referenced by the numeral 51. The knifelike member 51 is constructed from an electrical insulating substance, e. g., hard rubber or the like, for respectively interrupting a circuit between the base sockets 29, 33 and the meter sockets 43, 47, while rigidly supporting the meter assembly 11 to the meter base assembly 13.

The meter sockets 43, 47 are fixedly attached to the meter 11 in like manner as above explained for attaching the sockets 29, 33 to the meter base 13. In other words, the meter 11 includes a back side 53 (FIG. 5) formed from insulating material, e. g., bakelite or the like, and the meter sockets 43, 47 are fixedly attached thereto as with the bolts 55.

Figure 1:
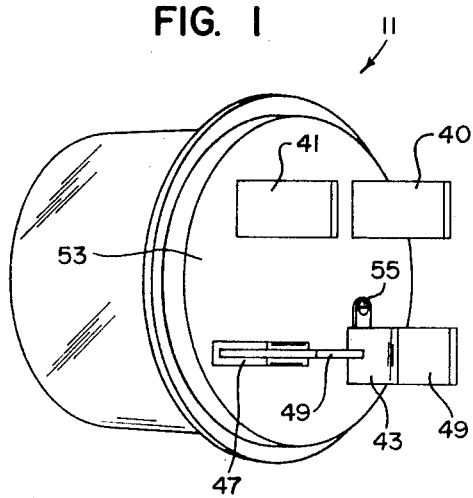
FIG. 1 is a perspective view showing the back side of the meter construction of the present invention.

From FIG. 1 of the drawings it may be seen that the conductive knifelike members 49 are inserted in the sockets 43, 47. This is the preferred arrangement preparatory to placing the meter 11 onto the base 13, i. e., as opposed to placing the members 49 in the sockets 29, 33 prior to placing the meter 11 onto the base 13, when it is not desired to discontinue electric service to the dwelling or the like. Accordingly, when the meter 11 is received by the meter base 13, the protruding portions of the members 49 are received in the base sockets 29, 33.

Particular attention is now directed towards FIG. 1 of the drawings wherein it may be seen that the socket 47 is positioned substantially 90° with respect to the alignment of the socket 43 and/or the terminals 40, 41. Thusly, it is assured that the meter assembly 11 will always be properly oriented when installed on the meter base 13. This is to insure that the proper terminals, i. e., terminals 40, 41, of the meter assembly 11 are always connected to the live sockets 27, 31 whether the service has been discontinued or not. In this manner, certain internal structure of the meter 11 may remain activated at all times to preclude the moisture collecting within the meter 11. Additionally, the likelihood of an unscrupulous person disorienting the meter 11 180° so as to cause it to run backwards or in certain cases not run at all is also obviated.

From the above disclosure, it should now be apparent to those skilled in the art that the two pairs of sockets 29, 43; 33, 47 normally are bridged with the electrical conducting knifelike members 49. In the event it is desirable that electrical service be discontinued, the members 49 are simply replaced by the insulating members 51. Accordingly, the likelihood of an unauthorized person reconnecting the two pairs of sockets 29, 43; 33, 47 is considerably more difficult than simply removing a sheathe, e. g., like the Johannson '362 patent. This is based on the fact that it is necessary to add a component in order to reconnect the service rather than simply removing a component. In this regard, the power company personnel preferably would maintain close control of the conducting knifelike members 49, making it difficult for the average person to obtain a member 49.

Although the invention has been described and illustrated with respect to preferred embodiments thereof, it is not to be so limited since changes and modifications may be made therein which are within the full intended scope of the invention.

I claim:

1. In an electric meter construction having a meter base assembly with first and second groups of conductors respectively terminating at base cliplike sockets attached thereto establishing an open circuit between said first and second group of conductors with said first group of conductors being communicated with a commercial source of electrical power, a meter movement assembly intended to be removably received by said sockets attached to said meter base assembly and in so doing normally completing an electrical circuit between said first and second groups of conductors, a plurality of bladelike terminals attached to said meter assembly and being arranged thereon to respectively engage said base cliplike sockets having said first group of conductors attached thereto when said meter assembly is received on said base assembly, a plurality of meter cliplike sockets attached to said meter assembly and being arranged thereon to respectively be aligned with said base cliplike sockets having said second group of conductors attached thereto and having a spaced apart distance therefrom when said meter assembly is received on said base assembly, and a plurality of knifelike means respectively having one of the ends thereof removably received in said base cliplike sockets having said second group of conductors attached thereto and the opposite ends thereof being removably received in said meter cliplike sockets for bridging said spaced distances therebetween.

2. The electric meter construction of claim 1 in which said plurality of knifelike means are constructed from an electrical conducting substance for completing a circuit while rigidly supporting said meter assembly to said meter base assembly.

3. The electric meter construction of claim 1 in which said plurality of knifelike means are constructed from an electrical insulating substance for interrupting a circuit while rigidly supporting said meter assembly to said meter base assembly.

* * * * *